United States Patent

Kocis et al.

[11] Patent Number: 5,854,828
[45] Date of Patent: Dec. 29, 1998

[54] TELEPHONE CUSTOMER SUPPORT UTILITY

[75] Inventors: Thomas J. Kocis; Mark Larson, both of Austin; Charles W. Morrison, Terrell; Stephen K. Smith, Spicewood, all of Tex.

[73] Assignee: Dell U.S.A., L.P., Round Rock, Tex.

[21] Appl. No.: 699,845

[22] Filed: Aug. 20, 1996

[51] Int. Cl.⁶ .......................... H04M 11/00; G06F 11/00
[52] U.S. Cl. ................................. 379/93.31; 379/93.31; 379/93.28; 379/93.37; 395/183.01; 395/183.03; 395/183.22
[58] Field of Search .............................. 379/90.01, 93.01, 379/93.26, 93.28, 93.31, 93.37, 106.01, 102.01, 102.02, 102.03, 93.27, 93.23; 395/183.01–183.22

[56] References Cited

U.S. PATENT DOCUMENTS

| | | | |
|---|---|---|---|
| 3,889,062 | 6/1975 | Epstein | 379/93.37 |
| 4,356,545 | 10/1982 | West | 395/183.22 |
| 4,425,625 | 1/1984 | Seligman et al. | 379/93.31 |
| 4,823,343 | 4/1989 | Takahashi | 395/183.22 |
| 5,367,667 | 11/1994 | Wahlquist et al. | 395/183.08 |
| 5,428,608 | 6/1995 | Freeman et al. | 379/93.28 |
| 5,455,933 | 10/1995 | Schieve et al. | 395/183.03 |
| 5,522,089 | 5/1996 | Kinkinis et al. | 379/93.23 |
| 5,553,123 | 9/1996 | Chan et al. | 379/102.03 |
| 5,678,002 | 10/1997 | Faucett et al. | 395/183.01 |

OTHER PUBLICATIONS

Newton's Telecom Dictionary, p. 36, Nov. 1994.

*Primary Examiner*—Curtis A. Kuntz
*Assistant Examiner*—George Eng
*Attorney, Agent, or Firm*—Haynes and Boone, L.L.P.

[57] ABSTRACT

A telephonic customer support utility for providing diagnostic support of a customer computer including encoding an operational status of a customer's computer to produce audible tones on a speaker corresponding to the encoded status for transmission on a standard telephone line via a standard telephone of the encoded operational status to a remote support computer, the remote support computer having a receiver electrically connected to receive the tones transmitted on the telephone line. The received tones are decoded by a decoder of the remote support computer to determine the operational status of the customer's computer, which status is displayed on a display of the remote support computer for analysis by a customer support technicians.

16 Claims, 3 Drawing Sheets

TELEPHONE CUSTOMER SUPPORT UTILITY

BACKGROUND OF THE INVENTION

The invention relates generally to a customer support utility and, more specifically, to a utility that provides for the transmission of information related to a computer through a normal telephone handset.

As competition among companies for product sales increases, significant attention is placed on providing increasingly effective customer support. The ability to provide the desired levels of customer support has become more difficult as the complexity of household appliances has increased. This, in part, is caused by the difficulty customers have when attempting to accurately describe the problems they are experiencing. This is particularly true of personal computers, where the majority of problems encountered involve finding and making minor changes to computer files, such as the ubiquitous CONFIG.SYS, AUTOEXEC.BAT and WIN.INI files, found on personal computers. This has resulted in longer interactions between customer support technicians and customers in order to satisfactorily resolve problems.

Historically, expensive or mission critical systems have incorporated a direct modem communication link to support technicians, to provide for the automatic transmission of errors and to allow support technicians direct access to such systems for purposes of diagnosing problems and effecting repairs. However, such direct communication is impractical with some home computers because of the cost associated with incorporating a modem, appropriate software, and/or phone line necessary for such direct communication. Additionally, certain organizations have installed telephone switching equipment that is incompatible with standard modems, thus frustrating such direct communication between a computer and the support technician. Moreover, even when a computer does include a modem and appropriate software, and an additional phone line is available, the customer is still typically required to phone the support technician and cause the computer to place a second call to allow direct communication with the support technician.

Therefore, what is needed is a customer support utility that enables a computer to transfer information related to its status directly to the customer support technician while the customer is on the phone, utilizing minimal hardware and without requiring additional phone lines.

SUMMARY OF THE INVENTION

The customer support utility of the present invention avoids and overcomes the above-mentioned disadvantages and drawbacks characteristic of the prior art. To this end, a status of a customer's computer is encoded by an encoder thereof and used to produce audible tones on a speaker electrically connected thereto, the audible tones corresponding to the encoded status for transmission by a standard telephone. The status may consist of any information available from or stored by the customer's computer. Additionally, the status may be encoded in any format, including modulated tone carrier (MTC) format and dual tone multifrequency (DTMF) format.

A remote support computer having a receiver and a decoder in communication with the receiver is provided to receive the tones transmitted by the telephone through the receiver. The tones are decoded into the status of the customer's computer and are displayed on a display for evaluation by a support technician.

In another aspect of the invention, the encoder and decoder may comprise computer programs.

In another aspect of the invention, the receiver may comprise a modem or a sound card in communication with a microphone.

In another aspect of the invention, the first computer could be replaced by any electrical device.

A technical advantage achieved with the invention is that it allows for the transmission of information regarding the status of a computer utilizing a standard telephone handset.

A further technical advantage achieved with the invention is that it does not require additional telephone lines.

A further technical advantage achieved with the invention is that it does not require the customer to hang up the phone during a conversation with the customer support technician in order to transmit data from the computer.

A further technical advantage achieved with the invention is that it requires no or minimal additional hardware to be installed in the customer's computer.

DESCRIPTION OF THE PREFERRED EMBODIMENT

Figure 1:
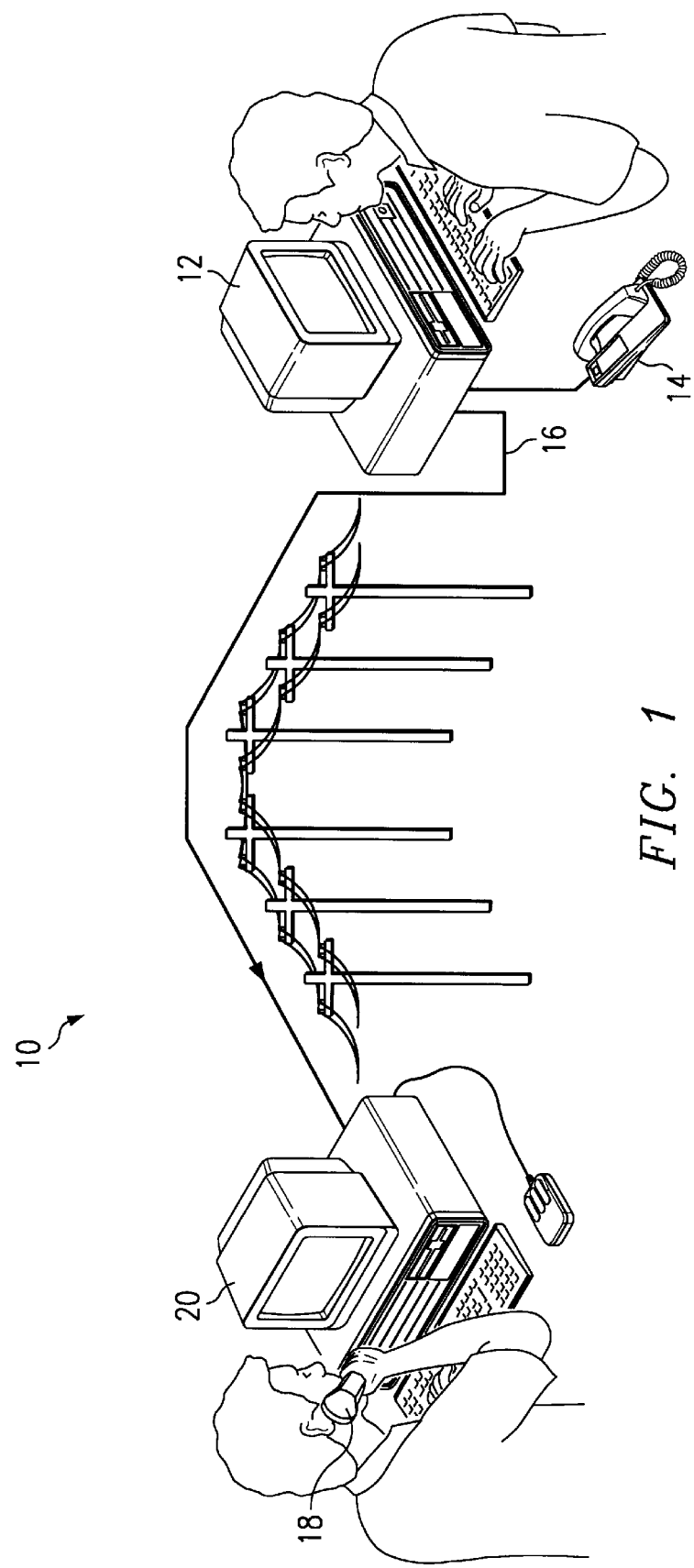
FIG. 1 illustrates a customer support utility embodying features of the present invention.
Figure 2:
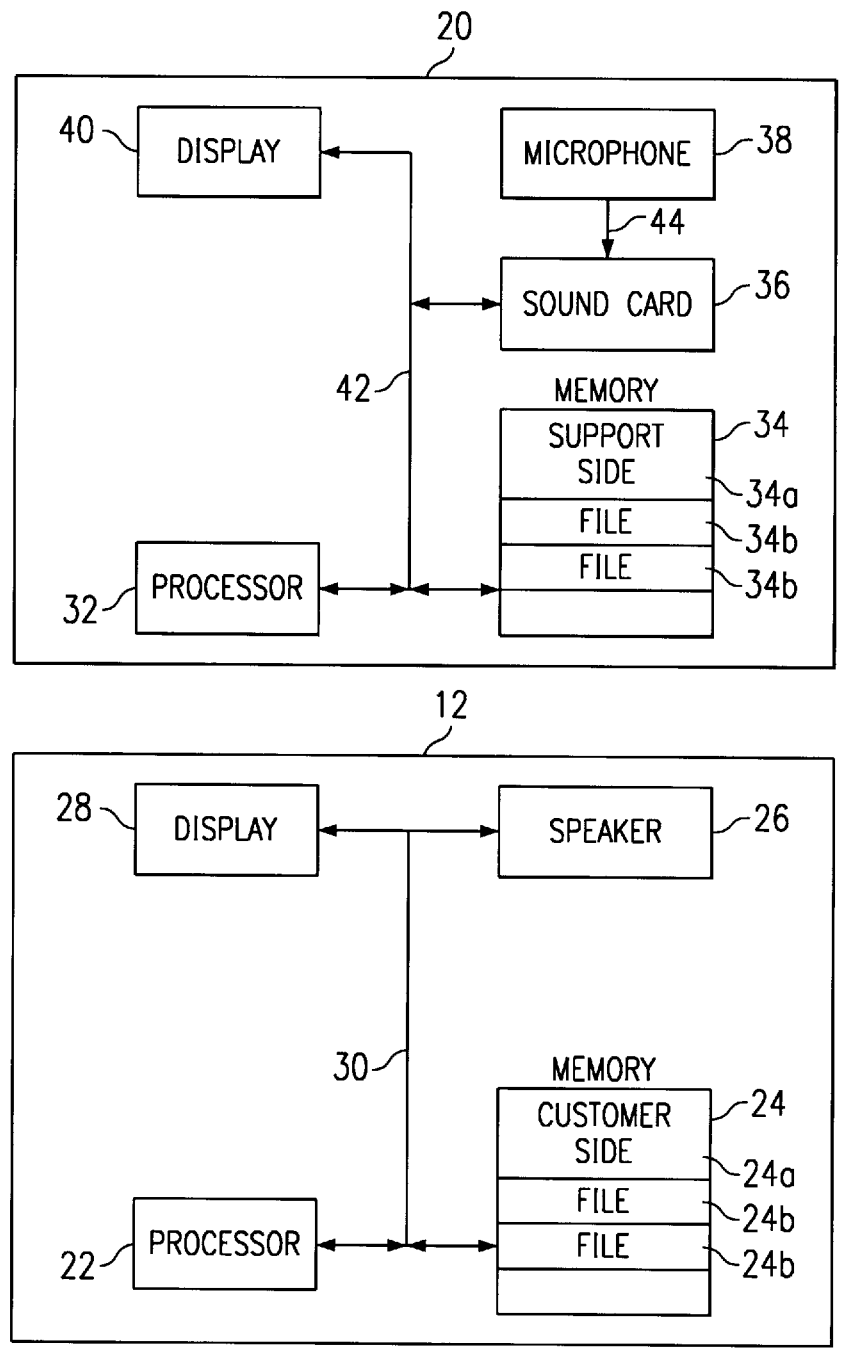
FIG. 2 is a block diagram of the customer support utility of FIG. 1.

Referring to FIGS. 1 and 2, the reference numeral 10 designates, in general, a customer support utility of the present invention. The customer support utility 10 comprises a customer computer 12, a telephone handset 14, a transmission line 16, telephone receiver 18, and a support computer 20. The customer computer 12 and support computer 20 are electrically connectable via the handset 14, transmission line 16 and receiver 18 to enable communication between the customer computer 12 and the support computer 20, as will be hereinafter described.

As shown in FIG. 2, the customer computer 12 comprises a processor 22, a memory 24, a speaker 26 and a display 28, all electrically interconnected via a bus 30. The memory 24 may be implemented in one or more technologies including dynamic RAM, hard disk drives, CD-ROM, and floppy disk drives. The memory 24 stores multiple software programs executable by the processor 22 and other files, such as customer-side software 24a and files 24b, all for purposes to be hereinafter described.

It is understood that the files 24b may consist of any one or more files that contain information which would be useful or helpful to a customer support technician, such as the CONFIG.SYS, AUTOEXEC.BAT and WIN.INI files. The files 24b may also consist of special purpose information, such as that created by diagnostic software resident on the customer computer 12.

The support computer 20 comprises a processor 32, a memory 34, a sound card 36, a microphone 38 and a display 40. The processor 32, memory 34, sound card 36 and display 40 are electrically interconnected via a bus 42. The microphone 38 and sound card 36 are electrically connected via a bus 44. The memory 34 also stores multiple software programs executable by the processor 32 and other files, such as support-side software 34a and files 34b, all for purposes to be hereinafter described.

Figure 3:
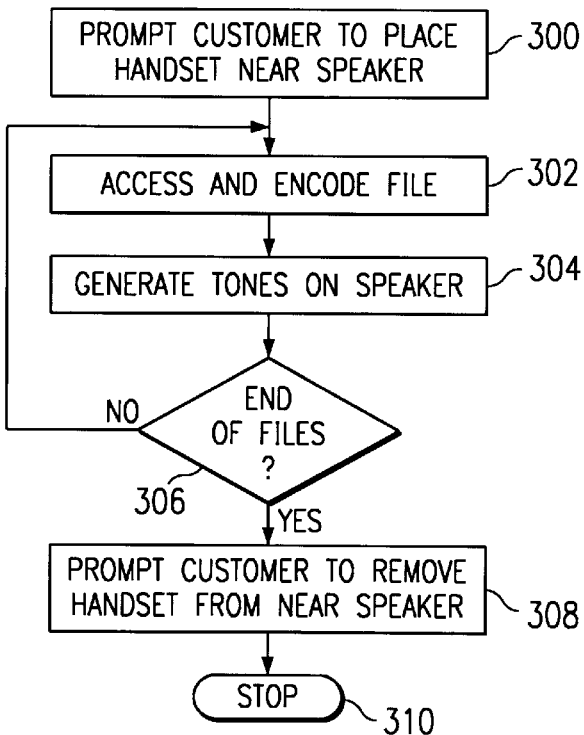
FIG. 3 is a flowchart of the customer-side software of the customer support utility shown in FIGS. 1 and 2.

FIG. 3 is a flow chart of the operation of the customer-side software 24a, or "encoder". Operation of the customer-side software 24a begins in step 300 where a prompt is displayed on the display 28 instructing the customer to place the telephone handset 14 near the speaker 26. Execution then proceeds to step 302 where one of the files 24b is accessed and encoded, as will be discussed, into signals suitable for generating appropriate tones on the speaker 26. It is understood that the tones are generated in any conventional manner by the speaker 26. Execution proceeds to step 304 where the speaker 26 is caused to generate the tones corresponding to the signals generated in step 302. Execution then proceeds to step 306 where a determination is made whether all the files 24b have been transferred. If additional files 24b remain to be transmitted, then execution returns to step 302. If all files 24b have been transmitted, execution proceeds to step 308 where the customer is prompted to remove the telephone handset 14 from the speaker and execution concludes in step 310.

Figure 4:
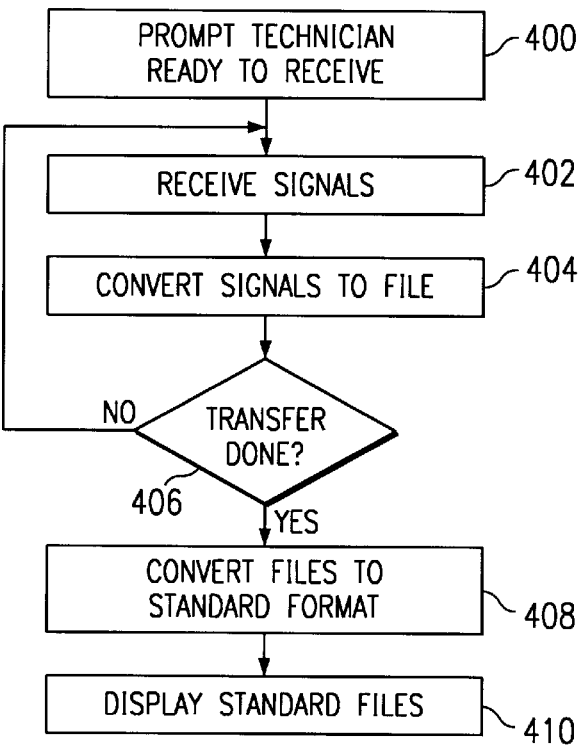
FIG. 4 is a flowchart of the support-side software of the customer support utility shown in FIGS. 1 and 2.

FIG. 4 is a flow chart of the operation of the support-side software 34a, or "decoder". Operation of the support-side software 34a begins in step 400 where a prompt is displayed on the display 40 instructing the support technician that the computer 20 is ready to receive information. Execution then proceeds to step 402 where the sound card 36 receives the tones generated by the speaker 26 and transmitted over the transmission line 16. Execution then proceeds to step 404 where the microprocessor 32 converts the tones received by the sound card 36 into an appropriate file format, such as the standard WAV file format, and stores them in the memory 34 as a file 34c. Execution then proceeds to step 406 where a determination is made whether the file transfer has been completed. It is understood that the customer-side software 24a may be programmed to transfer a fixed number of files, in which case the support-side software 34a may easily determine whether the transfer has been completed, or the customer-side software 24a may generate a unique tone sequence to signal that it has completed the transfer. If additional files 24b remain to be received, then execution returns to step 402. If all files 24b have been received, execution proceeds to step 408 where the file(s) 34c are converted into standard text format. Then execution proceeds to step 410 where the contents of the text format file(s) 34c are displayed on the display 40 for review and evaluation by the customer support technician. In this manner, the customer support technician is able to view the contents of the customer's CONFIG.SYS, AUTOEXEC.BAT and WIN.INI files, for example, and assist him or her in making appropriate changes to the files to remedy various problems being experienced by the customer.

In one embodiment of the present invention, the customer-side software 24a converts the files 24b into standard dual tone multifrequency (DTMF) modulation tones. This is accomplished by time multiplexing single tones on the speaker 26 to represent the DTMF tones. Utilizing DTMF modulation allows for the generation of 16 tones that can represent 4 bits of information. The files 24b are converted into packets of DTMF tones in any conventional manner. By varying the tone lengths, additional information can be transmitted, as start and end of file information.

In another embodiment of the present invention, the customer-side software 24a converts the files 24b into a modulated tone carrier (MTC) format. MTC utilizes a pattern of audible tones that can be generated by virtually any speaker, but which are typically impossible to be generated by human vocal cords. By utilizing such tones, it is possible to filter out conversations that might be inadvertently transmitted to the support computer 20. The MTC format consists of packets of information transmitted as follows:

TABLE 1

| Name of Signal | Frequency of Signal (hz) | Duration of Signal (msec) |
| --- | --- | --- |
| Beginning of Transmission (BOT) | 3000 | 10 |
| Byte One Marker (B1) | 600 | 4 |
| Nibble One (N1) | 1900–2650 | 8 |
| Nibble Two (N2) | 800–1175 | 8 |
| Byte Two Marker (B2) | 2800 | 4 |
| Nibble Three (N3) | 800–1175 | 8 |
| Nibble Four (N4) | 1900–2650 | 8 |
| End of Transmission (EOT) | 700 | 10 |

If more than two bytes of information need to be transferred, then following the fourth nibble N4, the sequence repeats starting with the first byte marker B1 until all of the information has been transferred.

By selecting the frequency ranges for each signal to alternate between high and low frequencies, the support-side software 34a is more easily able to decode the tone packets.

The frequency ranges for nibbles N1–N4 are each divided into 16 frequencies, which allows for each frequency to represent one of 16 values or 4 binary bits. The frequencies are divided as follows:

TABLE 2

| N1 and N4 1900–2650 hz | Hexadecimal character | N2 and N3 800–1175 hz |
| --- | --- | --- |
| 1900 | 0 | 800 |
| 1950 | 1 | 825 |
| 2000 | 2 | 850 |
| 2050 | 3 | 875 |
| 2100 | 4 | 900 |
| 2150 | 5 | 925 |
| 2200 | 6 | 950 |
| 2250 | 7 | 975 |
| 2300 | 8 | 1000 |
| 2350 | 9 | 1025 |
| 2400 | A | 1050 |
| 2450 | B | 1075 |
| 2500 | C | 1100 |
| 2550 | D | 1125 |
| 2600 | E | 1150 |
| 2650 | F | 1175 |

Regardless of the tone conversion utilized, the transmission speed can be increased by utilizing common compression algorithms. This is particularly true when the invention is used in the computer context where commonly transmitted files have many identical elements that are easily converted into a set of tokens that can be used by a compression algorithm to represent these elements. Accordingly, when the customer-side software 24a begins transferring information, it can be programmed to instruct the support-side software 34a as to which compression algorithm was used.

Operation of a typical customer service transaction will now be described with reference to FIGS. 1–4. Upon a customer's discovery of a problem with the customer computer 12, the customer places a call to a customer support technician through the telephone handset 14. If the customer support technician is unable to quickly solve the customer's problem, the customer support technician instructs the customer that it is necessary to transfer certain information from the customer's computer 12 to the support computer 20. The customer support technician then instructs the customer on how to find and start execution of the customer-side software 24*a*.

Once the customer-side software 24*a* has begun execution, the customer is instructed to place the telephone handset 14 near the speaker 26 of the customer computer 12. It should be understood that the information that is transferred may consist of data files, such as CONFIG.SYS, AUTOEXEC.BAT and WIN.INI, as well as such other information as computer serial number, configuration and fault status. The exact files that are transferred may be pre-programmed into the customer-side software 24*b*, or the customer may instruct the customer-side software 24*b* which files should be transferred. The customer-side software 24*a* then accesses the files that are required to be transferred, converts them into appropriate tones and plays those tones on the speaker 26. The tones are then transmitted to the support computer 20 via the transmission line 16. Upon receipt of the tones, the support-side software 34*a* converts the tones into text format file(s) 34*b*, the contents of which are displayed on the display 28 for analysis by the customer support technician.

When the transmission is completed, the customer is instructed to remove the telephone handset 14 from the speaker 26 and to resume conversation with the customer support technician. With the appropriate file(s) 34*b* now transferred to the customer support technician, the technician can rapidly diagnose problems and instruct the customer as to a proper remedy.

Although an illustrative embodiment of the invention has been shown and described, other modifications, changes, and substitutions are intended in the foregoing disclosure. For example, although the embodiment discussed above utilizes a microphone 38 and sound card 36 which converts the tones into .WAV files, it will be recognized that the sound card could include a digital signal processor to process the tones received over the transmission line 16 directly into a human readable file. Additionally, the transmission line 16 could be connected directly to the sound card 36, thus eliminating the need for a separate microphone 38. Additionally, the sound card 36 could be replaced by a modem which is designed to receive and interpret the transmitted tones. Additionally, the transmission line 16 could be replaced by any conventional transmission method. Additionally, the software described could be implemented by appropriate electrical circuitry.

It is also contemplated that electrical devices other than computers may be supported in accordance with the principles of the present invention.

Further, it is contemplated that electrical devices other than computers, such as washing machines, dryers, microwaves, and others, may be supported in accordance with the principles of the present invention. By incorporating the appropriate circuitry in an electrical device, the present invention provides a means to transfer information regarding the device. By having rapid and accurate information available to customer support technicians, problems which may have otherwise required on-site visits or which required significant time, may be solved quickly while the customer is on the phone. For those problems which require on-site visits by repair specialists, the repair specialist is dispatched with detailed information on the problem, enabling the repair specialist to know in advance the nature of the required repair and the parts which will be required.

Accordingly, it is appropriate that the appended claims be construed broadly and in a manner consistent with the scope of the invention.

What is claimed is:

1. A method for providing diagnostic support of a customer's computer using a standard telephone handset to communicate over a telecommunications network with a remote support computer, the method comprising:

encoding an operational status of the customer's computer in a manner capable of producing audible tones indicative of such operational status;

producing the audible tones on an audio speaker of the customer's computer in proximity to the telephone handset for communicating the audible tones over the telecommunications network to the remote support computer; and receiving the audible tones communicated over the telecommunications network by the remote support computer, the remote support computer including a receiver for receiving the audible tones communicated over the telecommunications network and a decoder for decoding the audible tones into data representing the operational status of the customer's computer for enabling appropriate diagnostic functions to be determined with the remote support computer;

wherein the receiver comprises a microphone electrically connected to a sound card, wherein the microphone receives the audible tones transmitted by the telephone and the sound card generates at least one file comprising the data representative of the operational status of the customer computer.

2. The method of claim 1, wherein the step of encoding comprises encoding the operational status into modulated tone carrier (MTC) format.

3. The method of claim 1, wherein the step of encoding comprises encoding the operational status into dual tone multifrequency (DTMF) format.

4. The method of claim 1 further comprising:

providing the remote support computer with a display; and displaying the operational status of the customer's computer on the display.

5. A customer support utility for providing diagnostic support of a customer computer using a standard telephone handset to communicate over a telecommunications network with a remote support computer, the customer support utility comprising:

an encoder electrically connected to the customer computer for encoding an operational status thereof in a manner capable of producing audible tones indicative of such operational status;

a speaker electrically connected to said customer computer for producing the audible tones;

a telephone handset proximate to the speaker for communicating the audible tones over the telecommunications network to the remote support computer;

a receiver electrically connected to the remote support computer for receiving the audible tones communicated over the telecommunications network; and a decoder electrically connected to the receiver for decoding the received audible tones into data representing the operational status of the customer computer wherein the receiver comprises a microphone electrically connected to a sound card, wherein the microphone receives the audible tones transmitted by the telephone and the sound card generates at least one file comprising the data representative of the operational status of the customer computer.

6. The customer support utility of claim 5, wherein the encoder comprises software stored in a memory of the customer computer and executed by a processor of the customer computer.

7. The customer support utility of claim 5, wherein the decoder comprises software stored in a memory of the remote support computer and executed by a processor of the remote support computer.

8. The customer support utility of claim 5, wherein the receiver comprises a modem.

9. The customer support utility of claim 5, further comprising a display electrically connected to the remote support computer for displaying the data representative of the operational status of the customer computer.

10. A customer support utility for providing diagnostic support of an electrical device, which device includes circuitry for recording the operational status of the device, wherein the utility uses a standard telephone handset to communicate over a telecommunications network with a remote support computer, the customer support utility comprising:

means electrically connected to the electrical device for encoding an operational status thereof in a manner capable of producing audible tones indicative of such operational status;

means electrically connected to said electrical device for producing the audible tones;

means proximate to the means for producing the audible tones speaker for communicating the audible tones over the telecommunications network to the remote support computer;

means electrically connected to the remote support computer for receiving the audible tones communicated over the telecommunications network; and means electrically connected to the means for receiving for decoding the received audible tones into data representing the operational status of the electrical device to enable appropriate diagnostic functions to be determined with the remote support computer wherein the means for receiving comprises a microphone electrically connected to a sound card, wherein the microphone receives the audible tones transmitted by the telephone and the sound card generates at least one file comprising the data representative of the operational status of the electrical device.

11. The customer support utility of claim 10, wherein the means for encoding comprises software stored in a memory of the electrical device and executed by a processor of the electrical device.

12. The customer support utility of claim 10, wherein the means for decoding comprises software stored in a memory of the remote support computer and executed by a processor of the remote support computer.

13. The customer support utility of claim 10, wherein the means for receiving comprises a modem.

14. The customer support utility of claim 10, further comprising means electrically connected to the remote support computer for displaying the data representative of the operational status of the electrical device.

15. The customer support utility of claim 10 wherein the audible tones are generated in a modulated tone carrier (MTC) format.

16. The customer support utility of claim 10 wherein the audible tones are generated in a dual tone multifrequency (DTMF) format.

* * * * *